(12) United States Patent
Rechtien et al.

(10) Patent No.: US 8,282,305 B2
(45) Date of Patent: Oct. 9, 2012

(54) BALL SLEEVE JOINT AND PROCESS FOR MANUFACTURING SAME

(75) Inventors: Martin Rechtien, Neuenkirchen-Voerden (DE); Volker Grube, Diepholz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 950 days.

(21) Appl. No.: 11/573,840

(22) PCT Filed: Aug. 5, 2005

(86) PCT No.: PCT/DE2005/001394
§ 371 (c)(1),
(2), (4) Date: Feb. 16, 2007

(87) PCT Pub. No.: WO2006/018005
PCT Pub. Date: Feb. 23, 2006

(65) Prior Publication Data
US 2007/0212165 A1    Sep. 13, 2007

(30) Foreign Application Priority Data
Aug. 19, 2004  (DE) .......................... 10 2004 040 412

(51) Int. Cl.
*F16C 11/00* (2006.01)
*F16C 23/04* (2006.01)

(52) U.S. Cl. ........ 403/131; 403/135; 403/141; 403/142; 403/143; 384/203

(58) Field of Classification Search .................. 403/122, 403/131, 133, 135, 141–143; 384/203
See application file for complete search history.

(56) References Cited

U.S. PATENT DOCUMENTS

| 3,099,879 | A | * | 8/1963 | Horovitz | 403/143 |
| 4,028,784 | A | | 6/1977 | Allison et al. | |
| 4,033,019 | A | | 7/1977 | Orkin et al. | |
| 5,915,842 | A | * | 6/1999 | Redinger | 384/203 |

FOREIGN PATENT DOCUMENTS

| DE | 197 56 984 A1 | 7/1999 |
| DE | 102 06 622 A1 | 8/2003 |
| GB | 1 547 052 | 6/1979 |

* cited by examiner

*Primary Examiner* — Victor Macarthur
(74) *Attorney, Agent, or Firm* — McGlew and Tuttle, P.C.

(57) ABSTRACT

A ball sleeve joint is provided, especially for chassis assembly units and steering assembly units of motor vehicles. The ball sleeve joint includes a joint housing with two housing halves and a ball sleeve provided with a rounded bearing surface. The bearing surface is accommodated in a joint housing, which is manufactured from an elastic plastic and is fixed in a recess of the joint housing, as well as a process for manufacturing such a ball sleeve joint. The two housing halves (3a, 3b) are pressed together with defined pressing forces during the mounting of the ball sleeve joint (1) in the direction of the longitudinal axis of the ball sleeve joint (1). The two housing parts are held in the installed position predetermined by the pressing forces by means of at least one connection (14) in substance between the housing parts (3a, 3b).

20 Claims, 3 Drawing Sheets

BALL SLEEVE JOINT AND PROCESS FOR MANUFACTURING SAME

CROSS REFERENCE TO RELATED APPLICATIONS

This application is a United States National Phase application of International Application PCT/DE2005/001394 and claims the benefit of priority under 35 U.S.C. §119 of German Patent Application DE 10 2004 040 412.7 filed Aug. 19, 2004, the entire contents of which are incorporated herein by reference.

FIELD OF THE INVENTION

The present invention pertains to sleeve joint especially for chassis assembly units and steering assembly units of motor vehicles and more particularly to a joint with a joint housing comprising two housing parts and a ball sleeve provided with a rounded bearing surface, wherein said bearing surface is accommodated in a bearing shell, which is manufactured from an elastic plastic and is fixed in a recess of the joint housing. The invention further relates to a process for preparing such a ball sleeve joint.

BACKGROUND OF THE INVENTION

Ball sleeve joints are known, in principle, in the state of the art and are used in various embodiments in all industrial areas, especially also in the automotive industry. As a rule, they must transmit very high dynamic radial loads as well as static preloads within the framework of their use. There are, in principle, two different design variants especially for the embodiment of the housings of such ball sleeve joints. On the one hand, the housing may be manufactured from a one-part tube, preferably one made of steel, into which the other components of the ball sleeve joint are fitted within the framework of the manufacture. The manufacturing steps provide here for the introduction of a first closing ring into the housing, after which the assembly unit comprising the ball sleeve and the bearing shell is inserted into the housing and finally fixed in the housing by means of a second closing ring.

As other design variants, two-part joint housings are known, which are interlocked with one another in the mounted state by elastic tooth elements. Shells made of plastic, which have a row of slots, which make it possible to pull the bearing shell over the ball surface for mounting with the bearing surface of the ball sleeve located inside, are usually used as bearing shells in both variants. The POM plastic material, which is preferably used here, has the drawback that the plastic material begins to creep under increased load and migrates into the slots present in the bearing shell. Increased clearance, which leads to failure of the entire component within a short period of time, will develop in the ball sleeve joint as a result.

Moreover, it was found that the above-described ball sleeve joints have a very low stiffness in the axial longitudinal direction of the component, because the plastic can very easily yield in the axial longitudinal direction because of its creep properties and an axial clearance develops in this manner. This drawback is additionally supported by the fact that the joint closure must also be considered to be relatively elastic, especially in case of one-part ball sleeve joints, due to closing rings designed as sheet metal parts, and the ball shell, fixed by the closing rings, cannot be sufficiently supported in case of a correspondingly increased load.

SUMMARY OF THE INVENTION

Based on the described drawbacks of ball sleeve joints known from the state of the art, the object according to the present invention is to improve a ball sleeve joint of the type of this class such that its service life is considerably increased compared to prior-art embodiments, and the manufacturing costs of such a joint can also be estimated to be low at the same time. Moreover, compensation of tolerances in the dimensions, especially between the bearing shell and the joint housing, shall be brought about by suitable measures with simple means, because the manufacturing process costs can be significantly lowered in case of a broader range of the usually narrow tolerance values of ball sleeve joints.

According to the invention, a ball sleeve joint is provided, especially for chassis assembly units and steering assembly units of motor vehicles. The ball sleeve joint includes a joint housing comprising two housing halves (parts) and a ball sleeve provided with a rounded bearing surface. The bearing shell is manufactured from an elastic plastic and is fixed in a recess of the joint housing. The bearing surface is accommodated in the bearing shell. The two housing halves are pressed together in the direction of the central longitudinal axis of the ball sleeve joint with defined pressing forces during the mounting of the ball sleeve joint and are held in the installed position preset by the pressing forces by means at least one the connection in substance (material connection) between the housing halves. This provides a construction with a compression of the bearing shell with the housing parts held in position.

The technical teaching concerning the ball sleeve joint is essentially that the two housing halves or parts are pressed together with defined pressing forces during the mounting of the ball sleeve joint in the direction of the longitudinal axis of the ball sleeve joint and are held in the installed position preset by the pressing forces by means of at least one connection in substance (a material connection) between the housing halves.

A prestress can be brought about within the bearing shell by the defined pressing forces, and the static characteristics are determined in case of such a prestress by the defined pressing forces during the mounting process between the housing halves rather than by the manufacturing tolerances of the individual parts as well as optionally by the deformation process within the framework of the fixation of the closing rings, contrary to the current state of the art. The stiffness of the joint can thus be established by the imposed prestress with very low dispersions of the values.

In addition, partially increased prestresses can be generated in the bearing shell by the defined pressing forces, as a result of which defined, small friction radii will be obtained. To achieve this effect, offset of the radii of the ball centers from the bearing shell and the housing halves surrounding same is necessary.

The process according to the present invention makes provisions for applying defined pressing forces on the housing halves for pressing together after the introduction of the ball sleeve and the bearing shell into the recess of the joint housing, which pressing forces are transmitted to the bearing shell through the inner surface of the recess in the housing halves, and for the housing halves being fixed to one another in the installed position predetermined by the pressing forces by means of at least one connection in substance between the housing halves.

The application of the pressing forces to the housing halves is a possibility that can be embodied in a technologically simple manner to bring about, in conjunction with the elastic properties of the bearing shell, a compensation of the dimensional tolerances of the components mounted with one another, and the defined pressing forces guarantee increased stiffness of the joint due to the prestress, which is controlled in terms of force, as a consequence of the pressing together of the bearing shell halves.

The force-controlled prestress can be embodied with small dispersion tolerances. Moreover, it is guaranteed that no additional external forces will act on the bearing shell due to the subsequent connection in substance, unlike, for example, in case of fixation of the bearing shell by means of closing rings fixed by rolling. The connection in substance itself, be it brought about by a welding operation, a soldering operating or a bonding operation, can be embodied at low cost because of the general technical conditions and the currently common devices, so that the manufacturing costs are, on the whole, markedly lower than was hitherto usual as a consequence of the process according to the present invention.

Special embodiments of both the ball sleeve joint according to the present invention are discussed below. It proved to be especially advantageous concerning the ball sleeve joint to prepare the connection in substance as a welding. Tempering of the joint can be achieved by the heat supplied during the welding process, as a result of which a better contact pattern is generated in the joint and a subsequent settling of the bearing shell is prevented from occurring.

If the bearing shells are provided at least with a holding projection projecting from the surface on their outer surface contacting the inner wall of the recess of the joint housing, for which a corresponding depression is prepared in the recess of the joint housing, securing against displacement and twisting can be achieved by this fact, and a maximum possible bearing surface is ensured at the same time due to an otherwise constant wall thickness of the bearing shell. The holding projection may be designed as a radially circumferential holding collar, which meshes with a radially circumferential groove of the joint housing, the groove being in turn prepared partly in both housing halves.

The housing halves can be fixed to one another, corresponding to an advantageous variant of the inventive idea according to the present invention, for example, by a laser welded connection, which may comprise individual weld sections arranged circumferentially on the outer contour of the joint housing, or may be designed, as an alternative, as a circumferential welded connection at the outer contours of the joint housing.

Embodying the welded connection as a laser weld is advantageous especially due to the fact that laser welding is a low-cost and accurate possibility of establishing the welded connection.

The features essential for the present invention will be explained in greater detail below on the basis of two embodiment variants with respect to the ball sleeve joint as well as the corresponding manufacturing process.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
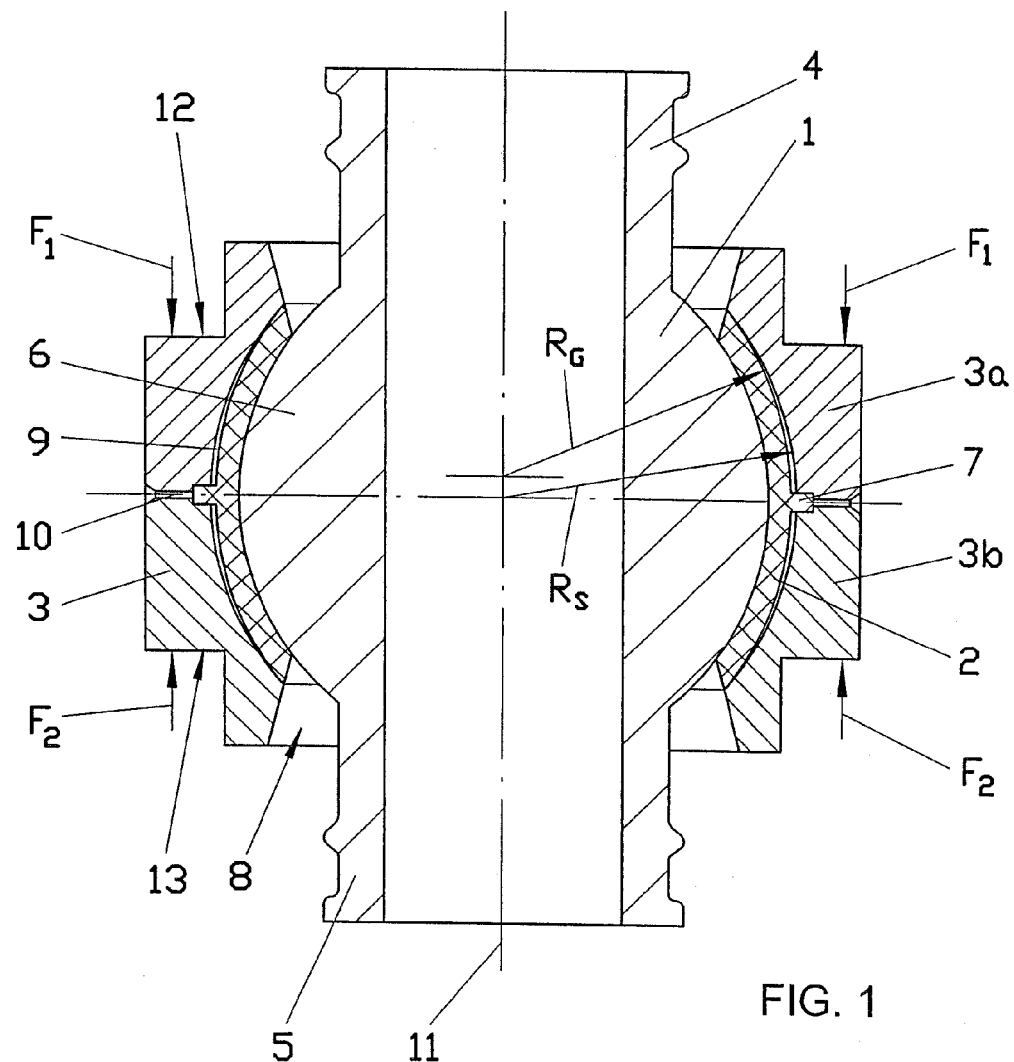
FIG. 1 is a sectional view through a ball sleeve joint according to the present invention during mounting.
Figure 2:
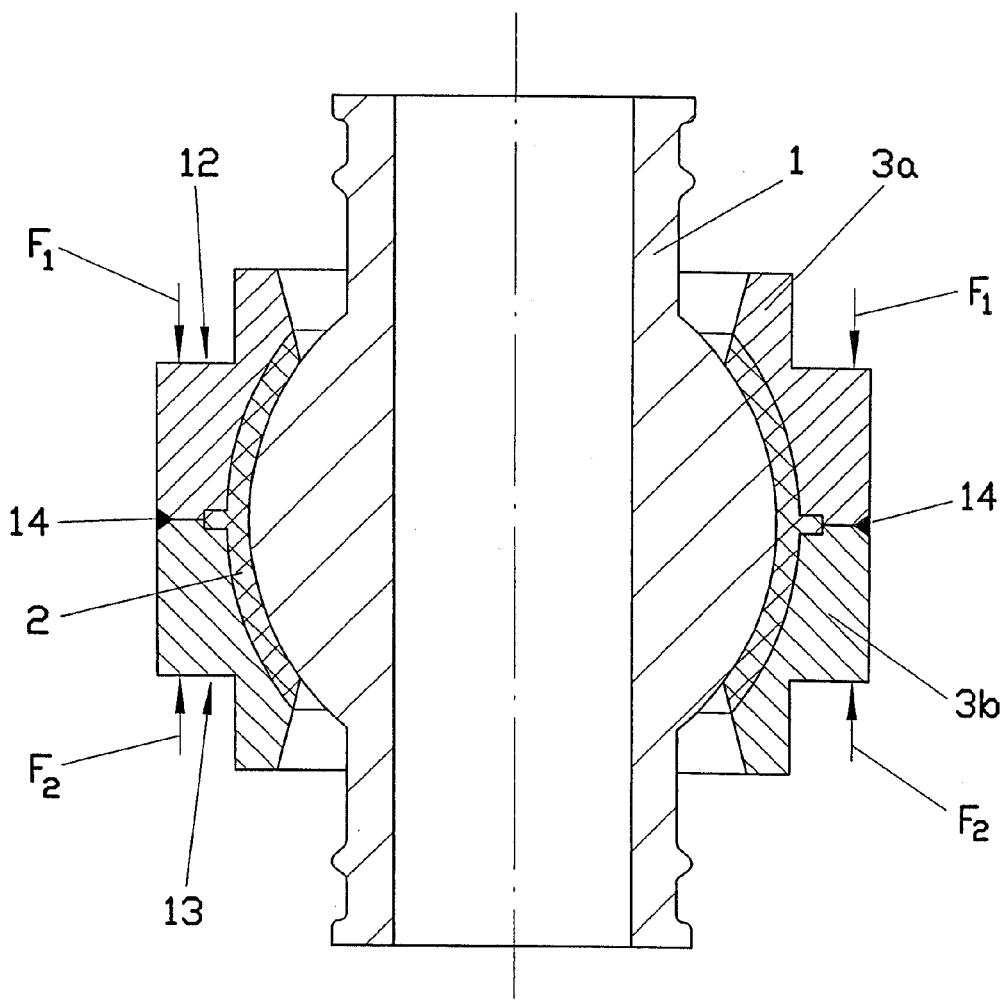
FIG. 2 is a sectional view of the ball sleeve joint from FIG. 1 after the end of the mounting.
Figure 3:
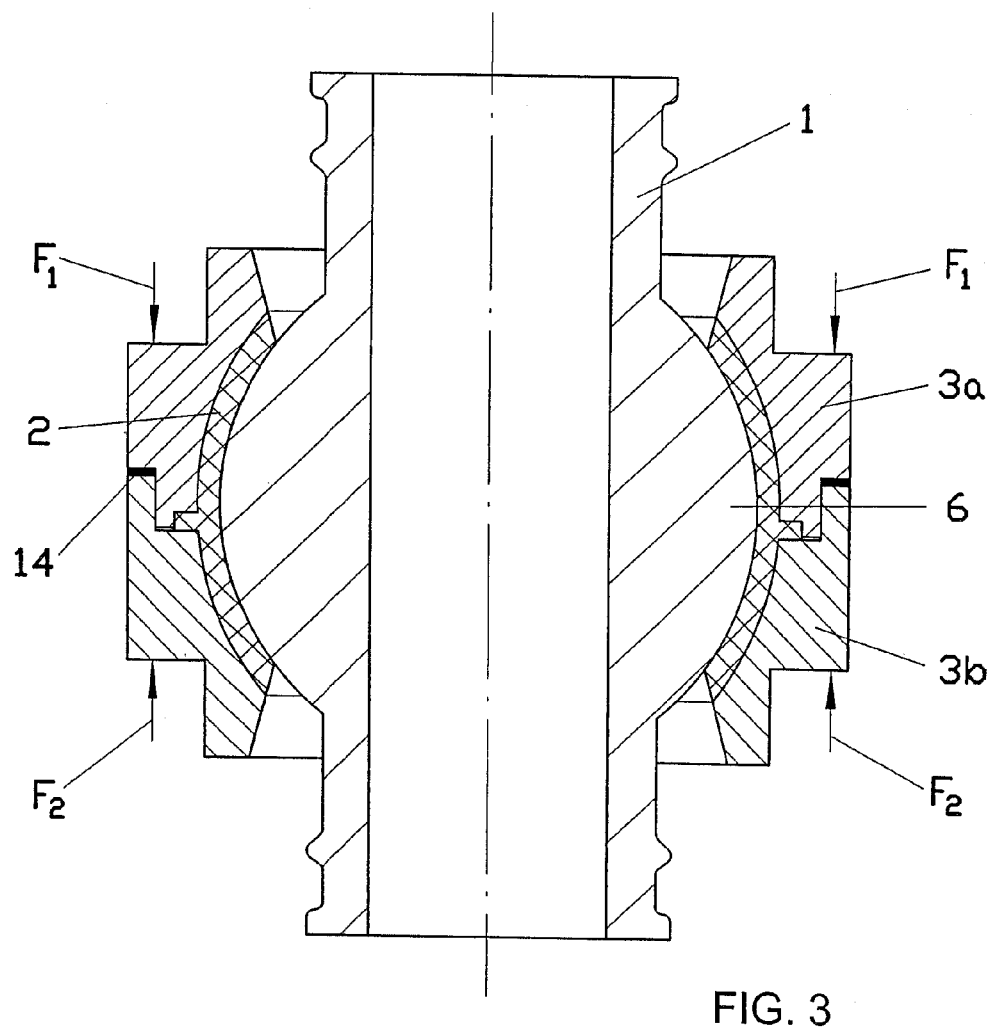
FIG. 3 is a sectional view of another embodiment variant of a ball sleeve joint according to the present invention.

Referring to the drawings in particular, the ball sleeve joint according to the present invention, which is shown in two different embodiment variants in FIGS. 1 through 3, comprises essentially a ball sleeve 1, which is provided with a through hole, a bearing shell 2 as well as a joint housing 3, which surrounds the bearing shell and is composed of two essentially symmetrically shaped housing halves (parts) 3a and 3b.

The ball sleeve 1 has two symmetrical end areas 4, 5 as well as a middle area, which is located between them and which is shaped as a spherical bearing surface 6 on its outer contour, but other embodiments, such as ovally shaped bearing surfaces, are conceivable as well. The bearing surface 6 is surrounded by the bearing shell 2, which likewise has a spherical shape corresponding to the contour of the bearing surface 6 and has an essentially constant thickness over its cross section in this exemplary embodiment. A holding projection 7, which is designed as a holding collar extending around the bearing shell, is located at the outer contour of the bearing shell 2. The bearing shell 2 is in turn surrounded by the joint housing 3, which has a recess 8 adapted to the outer contour of the bearing shell 2 for this purpose. It is indicated in FIG. 1 that the center of the ball radius of the bearing surface (RS) and the respective centers of radii (RG) of the inner surface of the joint housing parts 3a and 3b that form the recess of the joint housing are displaced with respect to one another in the direction of the central longitudinal axis 11. The radius (RG) of the housing part 3a is shown with a similar displacement of the radius of the housing part 3b.

It arises from this that the joint housing 3 comes into contact with the bearing shell 2 in the upper and lower end areas, whereas a space 9 is left between the bearing shell 2 and the inner surface of the recess of the joint housing 3 in the middle area of the spherical bearing shell.

The joint housing 3 is, as was already described above, of a two-part design, the housing halves or parts 3a and 3b providing half each of a groove-shaped recess. The housing halves 3a and 3b are pulled over the respective end area 4 and 5 of the ball sleeve 1 during mounting and displaced toward the center of the ball sleeve joint. As is apparent from FIG. 1, a space 10 is left between the housing halves 3a and 3b.

After the components of the ball sleeve joint have been put together, defined pressing forces are applied to the two housing halves 3a and 3b in the direction of the central longitudinal axis 11 on their outsides corresponding to the force vectors F1 and F2.

The pressing forces F1 and F2 act on the respective outer shoulder surfaces 12 and 13 and are directed against each other such that they bring about the pressing together of the housing halves 3a and 3b.

The result of the application of the pressing forces F1 and F2 is shown in FIG. 2. Both the space 9 and the space 10 have disappeared due to the elasticity of the bearing shell 2 as a consequence of the plasticity of the bearing shell originating from the plastic material. Thus, contact develops over the full areas between the bearing shell and both the spherical bearing surface 6 of the ball sleeve and the inner contour of the recess 8 of the housing halves 3a and 3b. Possible dimensional tolerances of the bearing shell 2, the ball sleeve 1 and the recess 8 of the joint housing 3 are thus eliminated by the controlled pressing together of the housing halves 3a and 3b.

In addition, a different distribution of the prestresses develops within the bearing shell in the exemplary embodiment being shown due to the different center of the ball radius RS and centers of the radii RG, as a result of which lower friction torques develop as a consequence of defined, smaller friction radii.

In the installed position of the housing halves 3a and 3b in relation to one another, which is found due to the pressing forces, the housing halves will then be connected to one another by means of a connection in substance in the form of a welded connection 14. The welded connection may be designed as a V-shaped seam in the shape being shown or have another shape. Especially laser welding has proved to be a practical and low-cost welding method for the embodiment being shown.

The heat introduced into the metallic housing halves 3a and 3b as a consequence of the welding operation leads, as an additional advantage, to tempering of the bearing shell made of plastic, i.e., the introduction of heat leads to the stresses becoming more uniform in the bearing shell. This corresponds to artificial aging, as a result of which a very good contact is obtained in the joint and subsequent settling or aging of the ball sleeve joint can no longer take place.

The advantage of the process according to the present invention is essentially that the defined pressing forces F1 and F2 can be preset corresponding to the preset tolerances of the components to be connected to one another, and prestressing of the bearing shell can be brought about at the same time in addition to the tolerance compensation, optionally with a different stress distribution within the cross section of the bearing shell due to corresponding pressing together of the housing halves 3a and 3b.

The subsequent joining in substance by means of a welding operation, soldering operation or a bonding operation leads, contrary to usual mounting techniques employed for ball sleeve joints, to no change in prestress whatsoever within the bearing shell, because, for example, the welding itself is not associated with any additional application of force to the joint.

The welding operation itself may be limited now to individual weld sections on the circumference of the joint housing 3 or it may be carried out, on the whole, circumferentially around the joint housing 3.

FIG. 3 shows another embodiment variant of the ball sleeve joint according to the present invention, in which the connection area between the housing halves 3a and 3b has a different shape. In its outer area facing the housing half 3a, the housing half 3b overlaps the other housing half, so that a collar located on the outside is obtained. This collar forms, moreover, a guide for the housing halves 3a and 3b during mounting, so that no additional devices are needed during the mounting process, when applying the forces F1 and F2, to position the housing halves 3a and 3b in relation to one another.

While specific embodiments of the invention have been shown and described in detail to illustrate the application of the principles of the invention, it will be understood that the invention may be embodied otherwise without departing from such principles.

The invention claimed is:

1. A ball sleeve joint, comprising:
a joint housing comprising two housing halves, said two housing halves forming an inner joint housing surface, said inner joint housing surface defining a recess of said joint housing and an inner joint housing surface depression;
a ball sleeve provided with a rounded bearing surface; and
a bearing shell, wherein said bearing surface is accommodated in said bearing shell, and said bearing shell is manufactured from an elastic plastic and said bearing shell is fixed in said recess of the joint housing, said two housing halves being pressed together in the direction of said central longitudinal axis of said ball sleeve joint with defined pressing forces during the mounting of said ball sleeve joint and are held in the installed position preset by the pressing forces by means at least one said connection in substance between said housing halves to generate one or more housing pressing forces from said two housing halves to said bearing shell, wherein a different distribution of prestresses develops within said bearing shell based on said one or more housing pressing forces, said bearing shell having an outer bearing shell surface, said outer bearing shell surface defining at least one holding projection, said inner joint housing surface depression receiving said at least one holding projection, said at least one holding projection engaging said inner joint housing surface, said connection in substance comprising an outer joint housing depression in an outer lateral area of said housing.

2. A ball sleeve joint in accordance with claim 1, wherein the connection in substance is a welded connection, said connection in substance comprising welded material in said outer joint housing depression, said welded material connecting one of said housing halves to another one of said housing halves.

3. A ball sleeve joint in accordance with claim 1, wherein the connection in substance is a soldered connection, said connection in substance comprising soldering material, said soldering material being provided in said outer joint housing depression, said soldering material connecting one of said housing halves to another one of said housing halves.

4. A ball sleeve joint in accordance with claim 1, wherein the connection in substance is a bonded connection.

5. A ball sleeve joint in accordance with claim 1, wherein said holding projection is shaped as a radially circumferential holding collar, which meshes with a radially circumferential groove of said joint housing.

6. A ball sleeve joint in accordance with claim 1, wherein said outer joint housing depression is prepared partly in both said housing halves, said housing parts exerting a greater compression at a top end and a bottom end of said bearing shell than a middle portion of said bearing shell.

7. A ball sleeve joint in accordance with claim 1, wherein the connection in substance consists of individual welded sections arranged circumferentially on the outer contour of said joint housing.

8. A ball sleeve joint in accordance with claim 1, wherein said connection in substance between said housing halves is formed at the outer edges of said joint housing in a circumferential pattern.

9. A ball sleeve joint in accordance with claim 1, wherein the centers of the ball radii ($R_s$) of said bearing surface and radii ($R_G$) of said recess of said joint housing are displaced to one another in the direction of said central longitudinal axis before said pressing forces are applied.

10. A ball sleeve joint in accordance with claim 1, wherein each of said housing halves defines a portion of said outer joint housing depression.

11. A ball sleeve joint in accordance with claim 1, wherein said outer joint housing depression is arranged opposite said inner joint housing surface depression.

12. A ball sleeve joint in accordance with claim 1, wherein a parting line between said housing halves ends in said outer joint housing depression and said inner joint housing surface depression.

13. A ball sleeve joint in accordance with claim 12, wherein said parting line is a straight line.

14. A ball sleeve joint, comprising:
a bearing shell comprising an elastic plastic and including an inner bearing surface and an outer surface, said bearing shell comprising a projection on said outer surface thereof;
a ball sleeve provided with a rounded bearing surface, said bearing surface being accommodated in said bearing shell;
a joint housing comprising two housing parts each having an inner wall surface and an outer side surface, said two housing parts being fixed together in a position to apply at least one contact pressing force to said bearing shell, wherein one portion of said bearing shell is compressed more than another portion of said bearing shell based on said at least one contact pressing force, said inner wall surface of one of said housing parts and said inner wall surface of another one of said housing parts defining an inner joint housing surface recess, said projection being inserted into said inner joint housing surface recess such that said projection engages said inner wall surface of one of said housing parts and said inner wall surface of another one of said housing parts, said outer side surface of one of said housing parts and said outer side surface of another one of said housing parts defining an outer joint housing recess.

15. A ball sleeve joint in accordance with claim 14, wherein said two housing parts are fixed together at said outer joint housing recess by one of a weld to form a welded connection, solder to form a soldered connection and a bonding material to form a bonded connection, one of said housing parts exerting a first housing compression force on a top end of said bearing shell and another one of said housing parts exerting a second compression force on a bottom end of said bearing shell, said housing parts exerting a middle compression force at a middle portion of said bearing shell, said first housing compression force and said second housing compression force being greater than said middle compression force.

16. A ball sleeve joint in accordance with claim 14, wherein said outer joint housing recess is located opposite said projection and said inner joint housing surface recess.

17. A ball sleeve joint in accordance with claim 14, wherein a center of a ball radius of said bearing surface and a center of each radii of said joint housing inner wall surface are displaced relative to one another in the direction of a central longitudinal axis before applying pressing forces to said housing parts to provide said contact pressing forces from each inner wall surface to said outer surface.

18. A ball sleeve joint in accordance with claim 14, wherein said two housing parts are fixed together by individual welded sections arranged circumferentially on the outer contour of said joint housing or a material connection at outer edges of said joint housing, provided in a circumferential pattern.

19. A ball sleeve joint, comprising:
a bearing shell comprising an elastic plastic, an inner bearing surface and an outer surface, said bearing shell comprising a projection on said outer surface thereof;
a ball sleeve provided with a rounded bearing surface, said bearing surface being accommodated in said bearing shell;
a joint housing comprising a first housing part and a second housing part, said first housing part having a first inner wall surface and a first outer wall surface, said second housing part having a second inner wall surface and a second outer wall surface, said first housing part and said second housing part being fixed together in a position such that one or more contact forces is applied to said bearing shell via said first housing part and said second housing part, wherein one portion of said bearing shell is provided with a prestress that is different from a prestress of another portion of said bearing shell based on said one or more contact forces, said inner wall surface of said first housing part and said inner wall surface of said second housing part defining an inner joint housing surface recess, said projection being inserted into said inner joint housing surface recess such that said projection engages said inner wall surface of said first housing part and said inner wall surface of said second housing part, said outer side surface of said first housing part and said outer side surface of said second housing part defining an outer joint housing recess and a substantially cylindrical outer joint surface, said outer side surface of said first housing part having a first circumference, said outer side surface of said second housing part having a second circumference, said first circumference being substantially equal to said second circumference, said outer joint housing recess being located opposite said projection and said inner joint housing surface recess, said first housing part engaging said second housing part at a location between said inner joint housing surface recess and said outer joint housing recess.

20. A ball sleeve joint in accordance with claim 19, wherein said bearing shell comprises a first end portion and a second end portion, one or more of said first housing part and said second housing part exerting a housing compression force to said first end portion and said second end portion, one or more of said first housing part and said second housing part exerting a middle compression force at a middle portion of said bearing shell, said housing compression force being greater than said middle compression force.

* * * * *